Sept. 14, 1965  R. J. DIEFENDORF  3,206,327
PHOSPHATE IMPREGNATED GRAPHITE AND METHOD
Filed Aug. 28, 1962
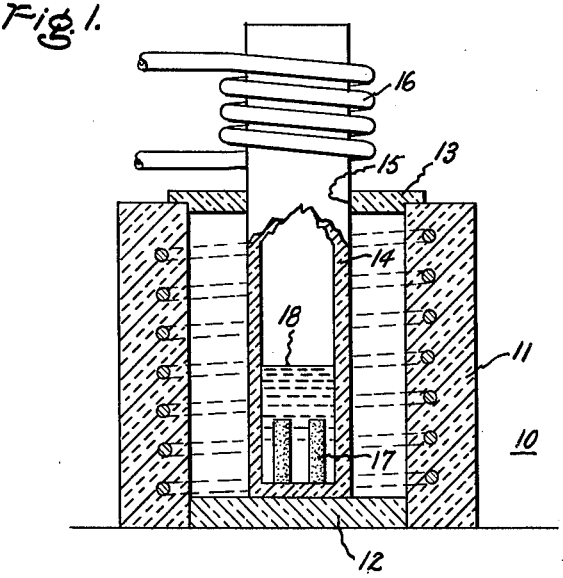
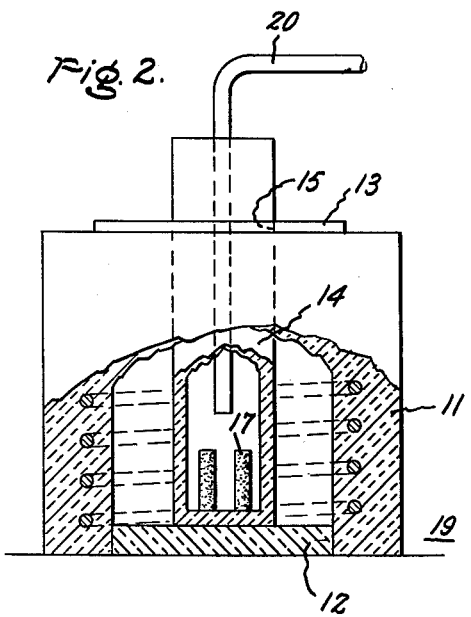
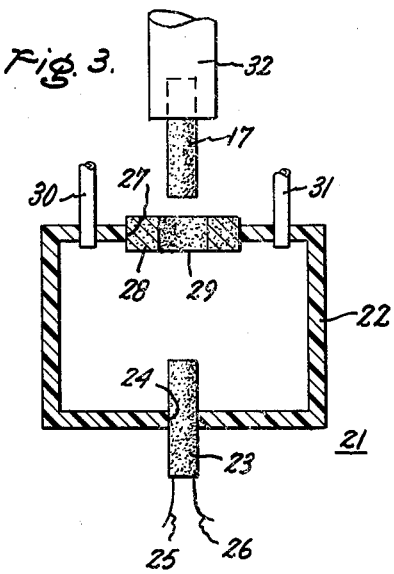
Inventor:
Russell J. Diefendorf,
by Paul R. Webb, II
His Attorney.

United States Patent Office 3,206,327
Patented Sept. 14, 1965

3,206,327
PHOSPHATE IMPREGNATED GRAPHITE
AND METHOD
Russell J. Diefendorf, Schenectady, N.Y., assignor to
General Electric Company, a corporation of New York
Filed Aug. 28, 1962, Ser. No. 219,867
3 Claims. (Cl. 117—121)

This invention relates to impregnated members and to methods of forming impregnated members and more particularly to impregnated carbon and graphite members and to methods of forming impregnated carbon and graphite members which inhibit surface atom combinations.

Missile and space propulsion components require materials which exhibit resistance to large heat inputs at the surface and resistance to oxidation. Various types of carbon and graphite solve partially the above requirements. However, it appears from calculations that approximately one-third the total heat absorbed by a missile nose cone re-entry is due to surface atom combination. Subsequent to such surface atom combination various materials formed thereby are ablated from the surface increasing the damage to the nose cone. Thus, it would be desirable to provide improved carbon and graphite members which would inhibit such surface atom combination and improve the ablation resistance of the members. It would also be advantageous to provide methods of forming such improved carbon and graphite members.

It is an object of my invention to provide a method of forming an improved carbon or graphite member.

It is another object of my invention to provide a method of forming an impregnated carbon or graphite member.

It is another object of my invention to provide a method of forming an impregnated carbon or graphite member exhibiting resistance to large heat inputs at the surface and resistance to oxidation.

It is a further object of my invention to provide a method of forming an impregnated carbon or graphite member which inhibits surface atom combination and improve ablation resistance.

It is a still further object of the invention to provide an impregnated carbon or graphite member.

In carrying out my invention in one form, a method of forming an impregnated member comprises immersing at least one member selected from the group consisting of carbon and graphite in an organic phosphate, heating the phosphate to its boiling point, refluxing the phosphate over the member thereby wetting the member, removing the excess phosphate, and heating the wetted member in an inert atmosphere to decompose the phosphate thereby forming an impregnated member.

These and various other objects, features and advantages of the invention will be better understood from the following description taken in connection with the accompanying drawing in which:

FIGURE 1 is a sectional view of apparatus for carrying out partially my method of forming an impregnated member;

FIGURE 2 is a partial sectional view of apparatus for completing my method of forming an impregnated member;

FIGURE 3 is a sectional view of apparatus for testing the impregnated member formed in the apparatus of FIGURES 1 and 2.

In FIGURE 1, apparatus is shown generally at 10 for carrying out partially my method of forming an impregnated member which comprises a resistance furnace 11 having bottom insulating block 12 and a top insulating cover 13. A chamber 14, for example, in the form of a silica tube is positioned within furnace 11 and extends outwardly therefrom through an aperture 15 in cover 13. A water-cooled coil 16 is positioned around the open upper end of chamber 14 above cover 13. A pair of members 17 in the form of commercial graphite rods, which are produced from petroleum coke and coal tar pitch, are located in the bottom of chamber 14. Rods 17 are shown immersed in an organic phosphate 18 such as trimethyl phosphate.

In FIGURE 2 of the drawing, apparatus is shown generally at 19 for completing my method of forming an impregnated member. Apparatus 19 includes resistance furnace 11 having a bottom insulating block 12 and a top insulating cover 13. Chamber 14 is positioned within furnace 11 and extends outwardly therefrom through aperture 15 in cover 13. Graphite rods 17 are shown positioned at the bottom of chamber 14. A glass tube 20, which is connected to an inert gas source (not shown), extends substantially into chamber 14 to sweep the chamber with an inert gas, such as argon or nitrogen.

I discovered unexpectedly that an impregnated member could be formed by immersing a member selected from the group consisting of carbon and graphite in an organic phosphate, heating the phosphate to its boiling point, refluxing phosphate over the member thereby wetting the member, removing the excess phosphate, and heating the wetted member in an inert atmosphere to decompose the phosphate thereby forming an impregnated graphite member.

Commercial carbon or graphite members are employed in my method. Organic phosphates, such as for example, trimethyl phosphate, triethyl phosphate and tricresyl phosphate provide the liquid in which the member is immersed. I found that refluxing an organic phosphate over the graphite member causes the phosphate to wet the member. It is also necessary to heat the wetted member in an inert atmosphere to decompose the phosphate thereby forming the impregnated member. It appears that upon decomposition of the phosphate, hydrogen and oxygen will be given off while a radical of the phosphate is impregnated into the member. My method provides a resulting impregnated member which inhibits surface atom combination and improves the ablation resistance of the member. In the operation of apparatus 10 in FIGURE 1 of the drawing, a pair of commercial graphite members 17 in the form of rods are positioned on the bottom of chamber 14 which chamber is located within furnace 11 and extends outwardly therefrom through aperture 15 in cover 13. An organic phosphate, trimethyl phosphate, is poured into chamber 14 to immerse rods 17 therein. A water-cooled coil 16 is positioned around the upper open end of chamber 14 above cover 13. Trimethyl phosphate 18 is heated by furnace 11 to its boiling point of 197.2° C. and maintained at this temperature. The phosphate is refluxed over members 17 for a period of time to wet members 17. Coil 16 condenses the vapor from the boiling trimethyl phosphate and returns it to the lower portion of chamber 14.

Coil 16 is removed from chamber 14 after completion of the refluxing step and chamber 14 is removed from furnace 11. The excess phosphate in the chamber is poured off while rods 17 are retained within the chamber. Chamber 14 is then replaced in furnace 11 and the apparatus is modified to provide apparatus 19 as shown in FIGURE 2.

In FIGURE 2 of the drawing, apparatus 19 is similar to apparatus 10 shown in FIGURE 1 except that a glass tube 20 is inserted substantially within chamber 14. The other end of the glass tube is connected to an inert gas source, such as argon or nitrogen. The temperature of furnace 11 is raised either prior to or after reinsertion of chamber 14 therein. For example, the furnace is maintained at a temperature of 1000° C. while a stream of gas, such as argon is flowed into chamber 14 to flush the chamber during the heating. This heating step in an inert atmosphere decomposes the phosphate thereby forming impregnated members. The heat input to the furnace is then terminated while the gas stream is continued during cooling of the apparatus to room temperature. The impregnated members are then removed from chamber 14.

In FIGURE 3 of the drawing, there is shown generally at 21 apparatus for testing the surface atom combination and ablation resistance of an impregnated member 17. Apparatus 21 comprises a hollow chamber 22 of a material such as Lucite. A carbon electrode 23 is positioned in an aperture 24 in one wall of chamber 22 and extends therein. A pair of leads 25 and 26 are connected to a suitable power source (not shown). A larger aperture 27 is provided in the opposite wall of chamber 22 and fitted with a carbon ring 28 having a central aperture 29 therethrough. Apertures 24 and 29 are in axial alignment. A water inlet nozzle 30 and a water outlet nozzle 31 are positioned preferably on the same wall of chamber 22 that supports carbon ring 28. A holder 32 positions an impregnated member 17 outside of chamber 22 and in axial alignment with aperture 29.

In the operation of apparatus 21 shown in FIGURE 3 of the drawing, an impregnated member 17 is positioned in holder 32 and spaced from the outlet end of aperture 29. Water is fed into chamber 22 through inlet nozzle 30 and discharged from the chamber through outlet 31. An arc is struck to ignite electrode 23 which creates and discharges a high velocity stream of steam through aperture 29 in ring 28. The steam is directed against the end of impregnated graphite member 17. After a short interval, the test is terminated. The same procedure is then followed employing a graphite member of the same dimensions as impregnated member 17 but without impregnation in accordance with the method of my invention. The impregnated member disclosed greater ablation resistance than the graphite member which is not impregnated.

An example of my method of forming an impregnated member in accordance with the present invention was as follows:

*Example 1*

Apparatus was set up in accordance with FIGURES 1 and 2 of the drawing. A commercial graphite rod was immersed in trimethyl phosphate within a silica chamber positioned within the furnace. A water-cooled coil was employed at the upper end of the chamber above its cover. The trimethyl phosphate was heated to its boiling point and retained at this temperature by the furnace. The trimethyl phosphate was refluxed over the graphite rod for a period of two hours. The excess trimethyl phosphate was then poured from the chamber so that only the graphite member remained within the chamber. The water-cooled coil was removed and a glass tube was inserted into the chamber. A supply of argon gas was flowed through the tube into the chamber to flush the chamber. The furnace was raised to a temperature of 1000° C. and maintained at this temperature to decompose the trimethyl phosphate. As soon as the reaction had stopped, which could be observed visually by the absence of a cloud of white smoke, the furnace heating was discontinued. The argon gas was continued into the chamber until the apparatus cooled to room temperature. The impregnated member was removed from the chamber.

This impregnated rod was tested in the apparatus disclosed in FIGURE 3 of the drawing. In this test the end of the rod was positioned two inches from the aperture outlet of the carbon ring. A high velocity stream of steam was directed against the end of the rod for a period of ten seconds. This procedure was repeated under the same conditions for a graphite rod which was not impregnated in accordance with my invention. The impregnated graphite member formed in accordance with the method of my invention disclosed 30 percent less ablation than did the rod which was not impregnated.

While other modifications of this invention and variation thereof which may be employed in the scope of the invention have not been described, the invention is intended to include such that may be embraced within the following claims.

What I claim as new and desire to secure by Letters Patent of the United States is:

1. A method of forming an impregnated member which comprises immersing at least one member selected from the group consisting of amorphous carbon and graphite in an organic phosphate, heating said phosphate to its boiling point, refluxing said phosphate over said member thereby wetting said member, removing the excess phosphate, and heating said wetted member in an inert atmosphere to decompose said phosphate thereby forming an impregnated member.

2. A method of forming an impregnated graphite member which comprises immersing at least one member selected from the group consisting of amorphous carbon and graphite in trimethyl phosphate, heating said trimethyl phosphate to its boiling point, refluxing said trimethyl phosphate over said member thereby wetting said member, removing the excess trimethyl phosphate, and heating said wetted member in an inert atmosphere to decompose said trimethyl phosphate thereby forming an impregnated member.

3. An impregnated member made in accordance with the method of claim 1.

References Cited by the Examiner

UNITED STATES PATENTS

| | | | |
|---|---|---|---|
| 2,143,639 | 1/39 | Caprio | 260—461.312 |
| 2,330,251 | 9/43 | Taylor et al. | 260—461.312 |

RICHARD D. NEVIUS, *Primary Examiner.*

REUBEN EPSTEIN, CARL D. QUARFORTH,
*Examiners.*